United States Patent [19]
Suzuki et al.

[11] Patent Number: 5,739,880
[45] Date of Patent: Apr. 14, 1998

[54] LIQUID CRYSTAL DISPLAY DEVICE HAVING A SHIELDING FILM FOR SHIELDING LIGHT FROM A LIGHT SOURCE

[75] Inventors: Masahiko Suzuki, Mobara; Tsutomu Isono, Ohtaki-machi; Kimitoshi Ohgiichi, Mobara; Akira Ishii, Mobara; Jun-ichi Ohwada, Mobara, all of Japan

[73] Assignee: Hitachi, Ltd., Tokyo, Japan

[21] Appl. No.: 753,765

[22] Filed: Nov. 29, 1996

[30] Foreign Application Priority Data

Dec. 1, 1995 [JP] Japan .................. 7-314406

[51] Int. Cl.$^6$ .................. G02F 1/1333; G02F 1/1345
[52] U.S. Cl. .................. 349/110; 349/58; 349/149
[58] Field of Search .................. 349/110, 58, 149, 349/153

[56] References Cited

U.S. PATENT DOCUMENTS

| 5,432,626 | 7/1995 | Sasuga .................. 349/58 |
|---|---|---|
| 5,477,357 | 12/1995 | Suzuki .................. 349/110 |
| 5,535,030 | 7/1996 | Ogura et al. .................. 349/153 |
| 5,539,552 | 7/1996 | Desai et al. .................. 349/58 |
| 5,633,739 | 5/1997 | Matsuyama et al. .................. 349/110 |

FOREIGN PATENT DOCUMENTS

| 617311 A1 | 9/1994 | European Pat. Off. .................. 349/149 |
|---|---|---|
| 60-120321 | 6/1985 | Japan .................. 349/110 |
| 6-82797 | 3/1994 | Japan .................. 349/153 |

*Primary Examiner*—William L. Sikes
*Assistant Examiner*—Tiep H. Nguyen
*Attorney, Agent, or Firm*—Antonelli, Terry, Stout, & Kraus, LLP

[57] ABSTRACT

In a liquid crystal display in which the region around a display region is reduced, a black matrix BM is made of a colored organic resin. Substantially all over the periphery of a seal member SL, there are formed portions in which the seal member SL and the black matrix BM are and are not overlapped. A shielding tape TAPE is stuck to that portion of the lower face of a lower transparent glass substrate SUB1, which corresponds to the non-overlapped portion, to prevent the leakage of light from the seal portion.

19 Claims, 9 Drawing Sheets

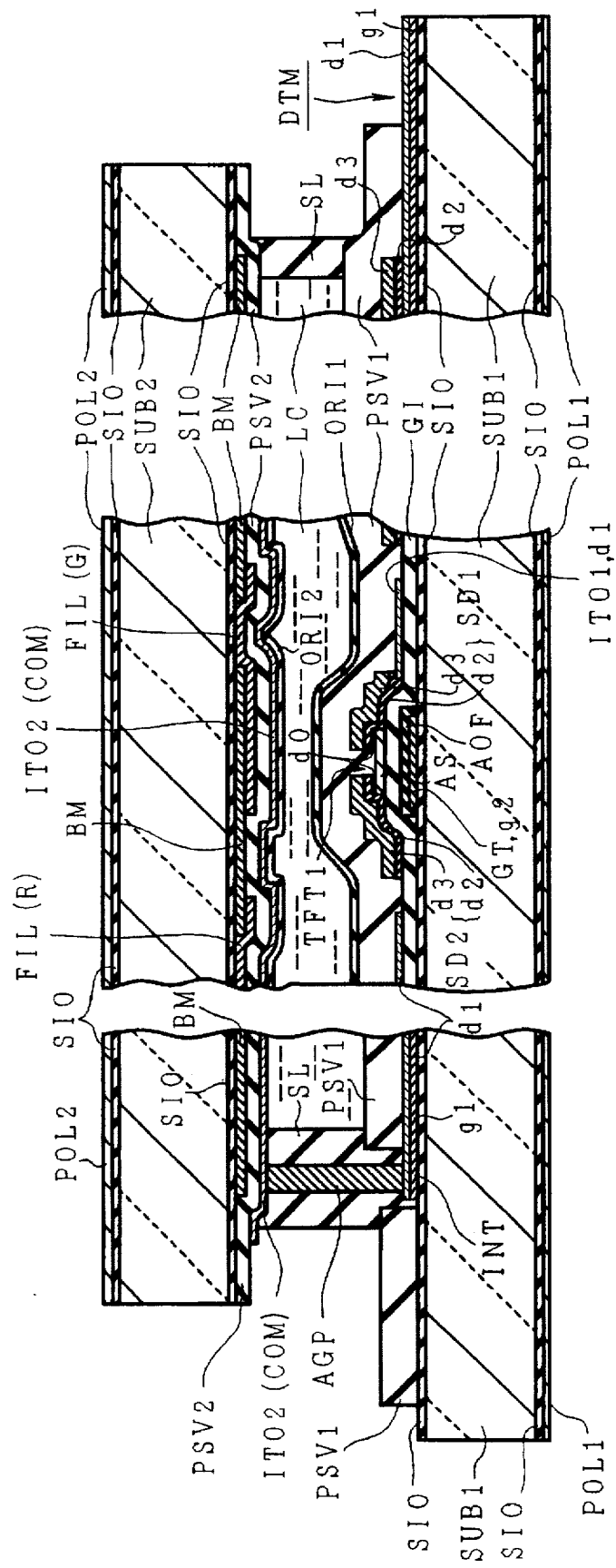

ns. 342229/1992 and 72540/1993.

LIQUID CRYSTAL DISPLAY DEVICE HAVING A SHIELDING FILM FOR SHIELDING LIGHT FROM A LIGHT SOURCE

BACKGROUND OF THE INVENTION

The present invention relates to a liquid crystal display device having a liquid crystal display element, in which two insulating substrates are superposed with a predetermined gap such that their faces having display transparent electrodes thereon confront each other and in which the two substrates are joined by a seal member formed in a frame shape at the peripheral edge portion between the two substrates thereby to seal a liquid crystal between the substrates inside the seal member, and, more particularly, to a liquid crystal display device having a black matrix on one substrate.

An active matrix liquid crystal display device is equipped with nonlinear elements (switching elements) individually corresponding to a plurality of pixel electrodes arrayed in a matrix. The liquid crystal at each pixel is theoretically driven (at a duty ratio of 1.0) at all times so that the active type has a better contrast than the so-called "simple matrix type" to which the time sharing drive system is adopted and has becoming a technique indispensable for the color liquid crystal display device. The switching elements are represented by thin film transistors (TFT).

Incidentally, an active matrix liquid crystal display device using thin film transistors is disclosed in U.S. Pat. No. 5,432,626, for example. A construction, in which the peripheries of pixel electrodes are covered with a shielding film made of a resin, is disclosed in Japanese Patent Laid-Open Nos. 342229/1992 and 72540/1993.

The liquid crystal display device comprises, for example: a liquid crystal display element (i.e., a liquid crystal display panel, a liquid crystal display portion, LCD: liquid crystal display) prepared by superposing transparent insulating substrates of two sheets of glass with a predetermined gap so that their faces on which display transparent pixel electrodes and an orientation film are formed respectively confront each other, by joining the two substrates by a seal member formed in a frame shape along the peripheries between the two substrates, by filling the inside of the seal member between the two substrates with a liquid crystal through a liquid crystal sealing port formed in a portion of the seal member thereby to seal it, and by mounting polarizing sheets on the outer sides of the two substrates: a back light arranged under the liquid crystal display element for emitting light to the liquid crystal display element; a circuit substrate arranged outside the periphery of the liquid crystal display element for driving the liquid crystal display element; and a frame member molded for holding the foregoing components; and a metallic shield case (or frame) having a liquid crystal display window.

SUMMARY OF THE INVENTION

Problems to be solved by the Invention

In a liquid crystal display element of the prior art, a black matrix is formed on the substrate to be equipped with a color filter. The black matrix is formed in a lattice around each of the pixels which are composed of transparent pixel electrodes arranged on the two upper and lower substrates, and the lattice defines an effective display region of each pixel so that the contour of each pixel can be clear to improve the contrast. Incidentally, the black matrix is extended to the periphery of the liquid crystal display element, where the seal member is provided, to shield that portion from light.

In the prior art, a metal film, such as a film of chromium (Cr), is used as the material for the black matrix. Incidentally, when the side of the substrate equipped with a black matrix to be formed over a wide area is the display screen side (the viewed side), the outside light (hereinafter referred to as "external light") on the display screen side is reflected from the black matrix to the outside (to the viewed side) if the black matrix is made of a reflective metal material, such as Cr, so that the screen is hard to view (like a mirror), resulting in a lower contrast and thereby raise a problem of a reduction of the display quality. In order to solve this problem, it has been proposed that the black matrix be made of an organic resin having a low reflectivity. Since the adhesion strength between the organic resin and the substrate drops in this case, a stress is applied to the portion where the seal member is provided (hereinafter referred to as the "seal portion") at the step of cutting the substrate in the process of manufacturing the liquid crystal display element, thus causing a problem in that a separation occurs in the interface between the black matrix and the substrate in the seal portion.

Unless the black matrix is arranged in the seal portion, on the other hand, light leaks from the seal portion, raising a problem that the display quality drops. If the seal portion is covered with a shield case so as to solve that problem, the size of the periphery of the display region, i.e. the so-called "picture-frame" portion is increased, raising a problem that the final external size of the liquid crystal display device, i.e., the display region of the liquid crystal display module is enlarged. In the prior art, therefore, the black matrix is extended to the seal portion, as described above.

An object of the present invention is to provide a liquid crystal display device capable of solving the problem of the reflection of the external light and preventing the separation of the substrate and the leakage of light from the seal portion, and having an excellent display quality and an excellent reliability over a wide display region.

Means for solving the Problems

In order to achieve the above-specified object, according to the present invention, there is provided a liquid crystal display device including a liquid crystal display element, in which first and second transparent insulating substrates are so superposed with a predetermined gap that their faces on which display transparent electrodes are provided confront each other, in which the two substrates are joined with a seal member provided in a frame shape on the peripheries of the two substrates, in which a liquid crystal is sealed between the two substrates inside the seal member and in which a black matrix is mounted on the first substrate. The liquid crystal display device is characterized in that the black matrix is made of a colored organic resin, and in that the portion where the seal member and the black matrix are overlapped when viewed in the direction perpendicular to the substrate face is formed over the substantially the whole periphery of the seal member on the display region side, whereas the portion where the seal member and the black matrix are not overlapped is provided on the side opposite to the display region.

There is also provided a liquid crystal display device including a liquid crystal display element, in which first and second transparent insulating substrates are so superposed with a predetermined gap that their inner faces where display transparent electrode are provided confront each other, in which the two substrates are joined with a seal member provided in a frame shape on the peripheries of the two substrates, in which a liquid crystal is sealed between the two substrates inside the seal member and in which a black matrix is mounted on the first substrate. The liquid crystal display device is characterized in that the black matrix is made of a colored organic resin, in that the seal member and the black matrix are partially overlapped when viewed in the direction perpendicular to the substrate face, over substantially the whole periphery of the seal member on the display region side, and in that a shield tape is provided on the outer side of the second insulating substrate at the portion where at least the seal member and the black matrix are not overlapped.

The liquid crystal display device is further characterized in that the black matrix is provided at the portion, where the seal member is provided, in the region of a display window of a shield case accommodating the liquid crystal display element.

The liquid crystal display device is further characterized in that at least the black matrix is provided at the portion where at least the shield case having the display window on the first substrate side and the wiring arranged in the inner face of the second substrate and made of a reflective metal are not overlapped when viewed in the direction perpendicular to the substrate face.

The liquid crystal display device is further characterized in that the end portion of the black matrix on the side opposite to the display region is arranged along the pattern of the wiring.

Since the black matrix is made of a colored organic resin of low reflectivity, according to the present invention, the following problem of the drop in the display quality can be solved. That is, when the substrate having the black matrix is located on the display screen side (the view side), the external light on the display screen side is reflected from the black matrix toward the outside (the view side) so that the screen becomes hard to view (like a mirror) causing a lower contrast and thereby raising the problem of a drop in the display quality.

When viewed in the direction perpendicular to the substrate face, moreover, over the substantially the whole periphery of the seal member excepting the liquid crystal sealing port, the black matrix, made of an organic resin having a low adhesion strength to the substrate or the seal member, is partially removed at the seal portion to form the portions where the black matrix and the seal member are and are not overlapped. A combination of the high adhesion strength of the substrate, the passivation film, and the seal material is achieved at the non-overlapped portion to improve the adhesion strength of the seal portion.

Moreover, since the shield tape is provided on the outer face of the substrate, where the black matrix is not provided, at the portion where the seal material and the black matrix are not overlapped, it is possible to prevent the back light from leaking from that portion of the seal portion. In other words, when the black matrix at the seal portion is partially removed to form a portion where it is not overlapped with the seal member, so as to improve the adhesion strength, the shield tape is used to prevent the leakage of the back light. Incidentally, if the construction is made such that the black matrix is not overlapped with the seal member in the least and such that the shield tape is extended to the non-overlapped portion from the substrate end portion, the end portion of the shield tape will come closer to the display region, and the shield tape may be seen from the display region if viewed obliquely from the side with respect to the substrate face. If the overlap between the seal member and the black matrix is present or absent all over the seal member, gap irregularity between the two substrates of the liquid crystal display element occurs to cause display irregularity. For these reasons, the black matrix and the seal member are overlapped all over the periphery.

When viewed in the direction perpendicular to the substrate face, moreover, at the portion where the shield case having the display window on the first substrate side having the black matrix and the wiring of the reflective metal arranged on the inner face of the second substrate are not overlapped, there is provided at least the black matrix. As a result, it is possible to prevent the reflection of external light from that portion in the seal portion. Specifically, when the black matrix is partially removed at the seal portion so as to improve the adhesion strength, the display quality is deteriorated if external light impinges on and reflects from the wiring. Thus, the black matrix is partially left at the portion leading from the shield case, that is, the metal wiring portion in the region of the display window, thereby to prevent the reflection of external light.

Still moreover, the masking of the seal portion with the shield case covering the outer periphery of the liquid crystal display element can be dispensed with to provide a small-sized liquid crystal display element of a wide screen having a wide display area.

BRIEF DESCRIPTION OF THE DRAWINGS

FIG. 5(A) is a section showing the vicinity of a panel corner of the liquid crystal display element according to the present invention;

FIG. 5(B) is a section showing a pixel portion of the liquid crystal display element according to the present invention;

FIG. 5(C) is a section showing the vicinity of a video signal terminal portion of the liquid crystal display element according to the present invention;

DESCRIPTION OF THE PREFERRED EMBODIMENTS

Figure 1:
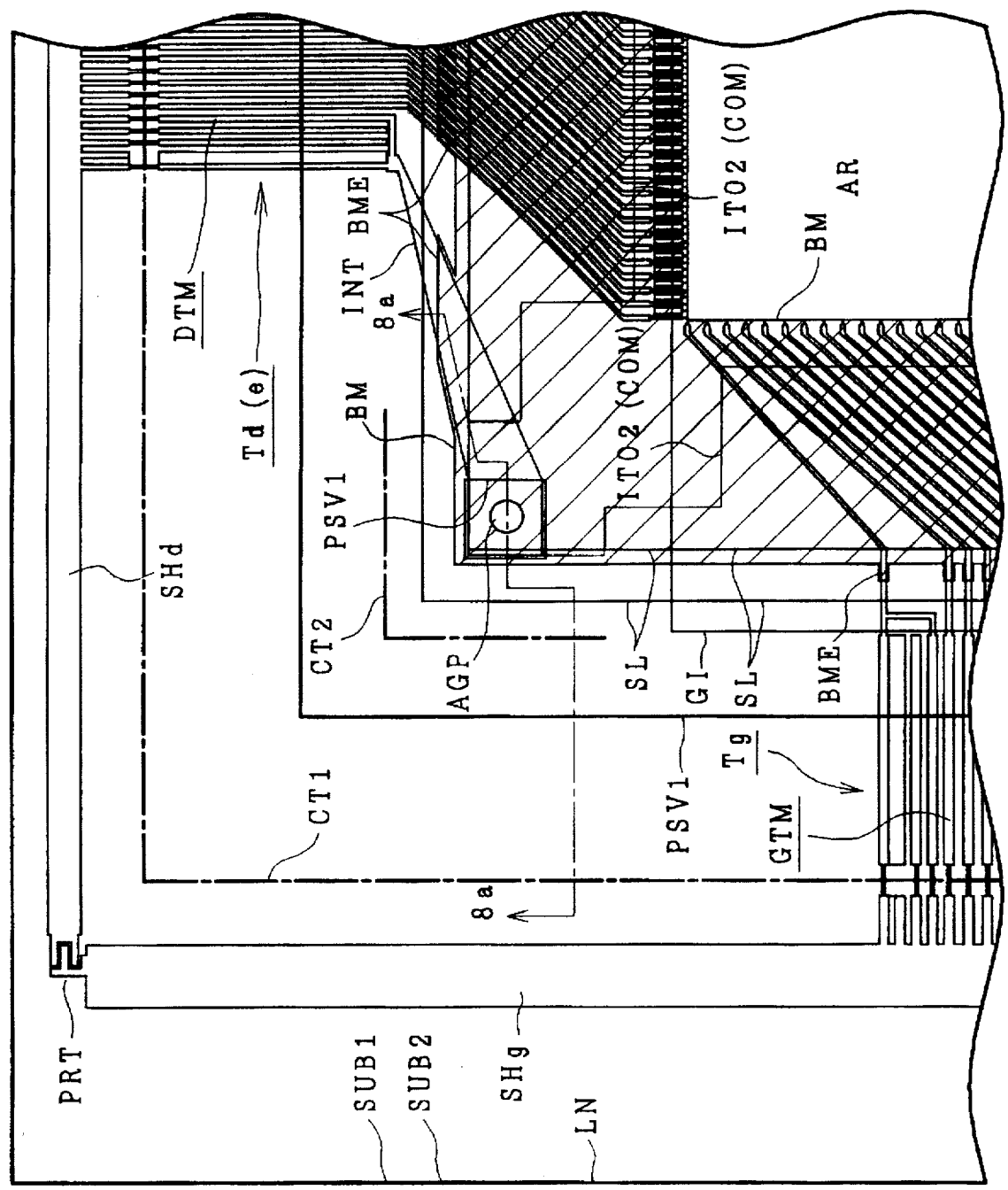
FIG. 1 is an enlarged top plan view showing a corner of a display panel including the electric connection of the upper and lower transparent substrate of an active matrix color liquid crystal display element according to the present invention.

The embodiments of the present invention will be described in detail with reference to the accompanying drawings.

Active Matrix Liquid Crystal Display Device

An embodiment will be described in which the present invention is applied to an active matrix type color liquid crystal display device. Incidentally, the portions having identical functions are designated by common reference characters in the drawings with reference to which description will be made, and their repeated description will be omitted.

Overall Construction of Liquid Crystal Display Module

Figure 3:
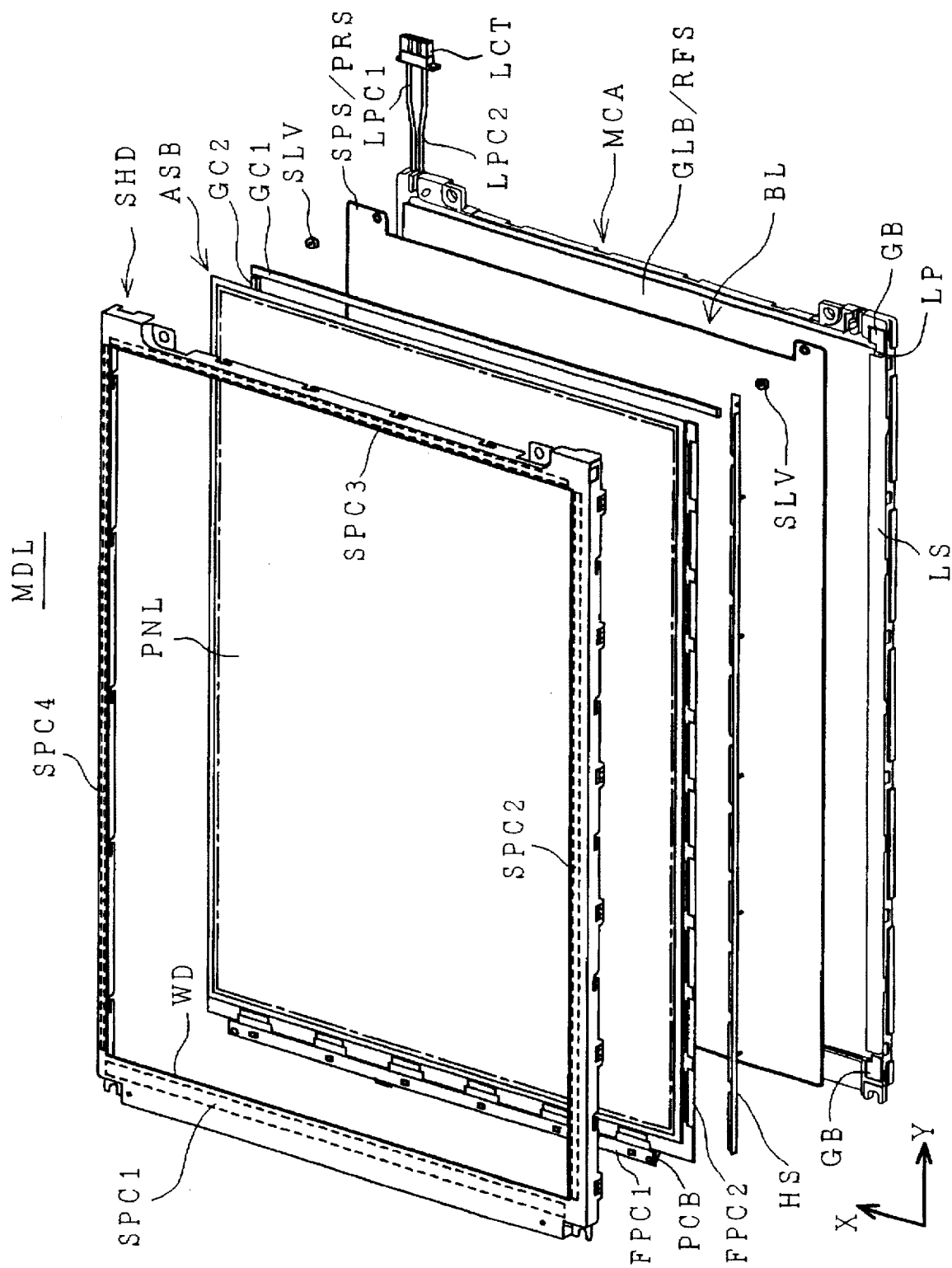
FIG. 3 is an exploded perspective view showing a liquid crystal display module.

FIG. 3 is an exploded perspective view showing a liquid crystal display module MDL.

Reference symbol SHD designates a shield case (hereinafter also referred to as the "metal frame") made of a metal sheet; symbol WD a display window: SPC1 to SPC4 insulating spacers; FPC1 and FPC2 multilayer flexible circuit boards (FPC1 designates a gate side circuit board whereas the FPC2 a drain side circuit board); HS a frame ground made of a metal foil for connecting the ground of the drain side circuit board FPC2 and the shield case SHD electrically; PCB an interface circuit board; ASB a liquid display element with an assembled driver circuit board; PNL a liquid crystal display element (hereinafter also referred to as the "liquid crystal display panel") where drive ICs are mounted on one of two overlapped transparent insulating substrates; GC1 and GC2 rubber cushions; PRS a prism sheet (composed of two optical sheets in the present embodiment); SPS a diffusion sheet; GLB an optical guide board; RFS a reflecting sheet; SLV a sleeve for fixing the diffusion sheet SPS and the prism sheet PRS; MCA a lower case (mold case) made by integral molding; LP a fluorescent tube; LS a reflector for reflecting the light of the fluorescent tube LP toward the optical guide board GLB; LPC1 and LPC2 lamp cables; LCT an inverter connector; and GB rubber bushes for supporting the fluorescent tube LP.

Symbol BL designates a back light composed of the fluorescent tube LP, the reflector LS, the optical guide board GLB, the reflecting sheet RFS, the diffusion sheet SPS and the prism sheet PRS, for uniformly irradiating the back of the liquid crystal display panel PNL with light so that the viewer may recognize the change of the optical transmissivity of the liquid crystal as the image display from the front of the liquid crystal display panel PNL.

As shown in FIG. 3, the lower case MCA, the back light BL, the liquid crystal display element ASB with the driver circuit board, and the shield case SHD are stacked to assemble the liquid crystal display module MDL.

Outline of Matrix Portion

Figure 4:
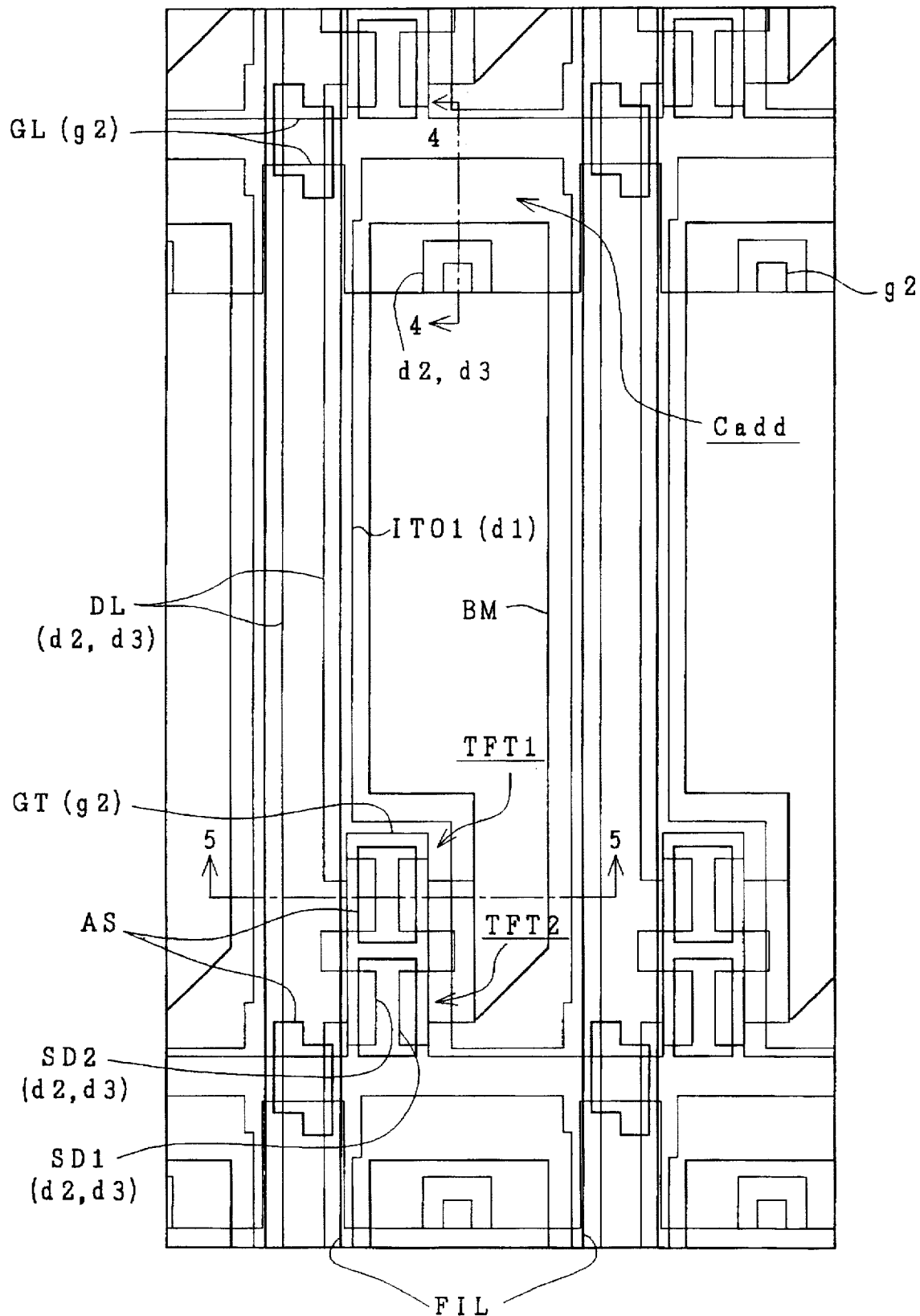
FIG. 4 is a top plan view showing a pixel portion of the active matrix color liquid crystal display element according to the present invention.

FIG. 4 is a top plan view showing a pixel portion of the active matrix color liquid crystal display element according to the present invention.

FIG. 5(a) is a section, at the center, showing the pixel portion of the active matrix color liquid crystal display element according to the present invention, and FIG. 5(a) and FIG. 5(c), on both sides, show the vicinity of a corner of the liquid crystal display element and the vicinity of the video signal terminal portion, respectively FIG. 5(b) corresponds to the section taken along line 5—5 of FIG. 4.

Each pixel is arranged is a region at the intersection (the region defined by four signal lines) of two adjoining scanning signal lines (gate signal lines or horizontal signal lines) GL and two adjoining video signal lines (drain signal lines or vertical signal lines) DL. Each pixel includes a thin film transistor TFT, a transparent pixel electrode ITO1 and an electric charge holding capacitive element Cadd. The scanning signal lines GL extend horizontally and are arranged vertically in a plurality of parallel lines. The video signal lines DL extends vertically and are arranged horizontally in a plurality of parallel lines.

With respect to a liquid crystal layer LC, as shown in FIG. 5(a), the thin film transistor TFT and the transparent pixel electrode ITO1 are provided on the lower transparent glass substrate SUB1 side, and a color filter FIL and a shielding black matrix pattern BM are provided on the upper transparent glass substrate SUB2 side. Silicon oxide films SIO are formed by dipping treatment on the two faces of the transparent glass substrates SUB1 and SUB2.

On the surface of the inner side (on the liquid crystal LC side) of the upper transparent glass substrate SUB2, there are sequentially formed the black matrix BM, the color filter FIL, a passivation film PSV2, a common transparent pixel electrode ITO2 (COM) and an upper orientation film ORI2.

Outline of Matrix Periphery

Figure 2:
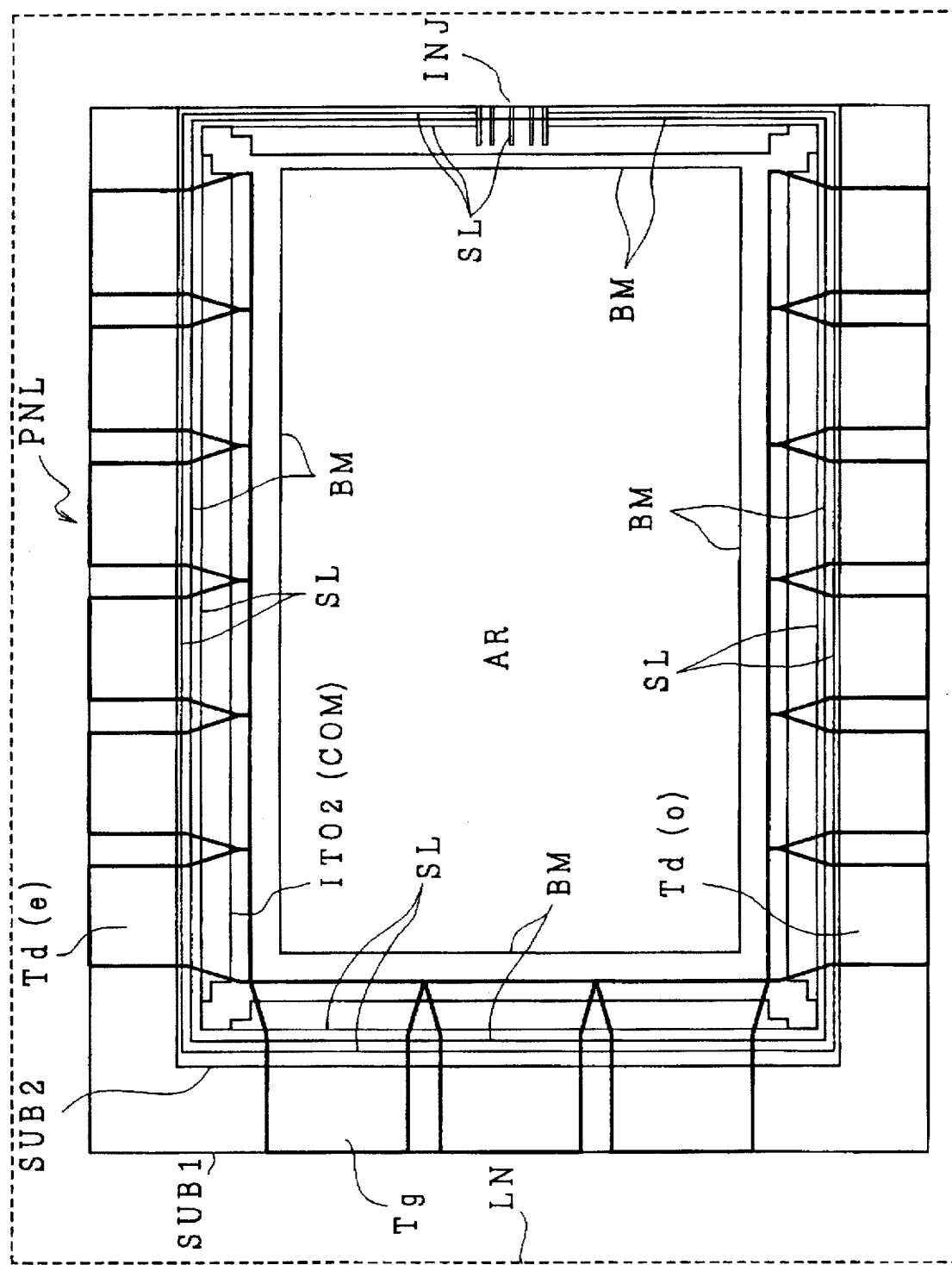
FIG. 2 is a top plan view of a panel, showing the construction of a matrix peripheral portion of the liquid crystal display element of the present invention more specifically by rather exaggerating the peripheral portion.

FIG. 2 is a top plan view in which the peripheral portion of the matrix (AR) of the liquid crystal display element (liquid crystal display panel) PNL including the upper and lower glass substrates SUB1 and SUB2 is exaggerated, and FIG. 1 is an enlarged top plan view showing the vicinity of a seal portion SL corresponding to the lefthand upper corner of the panel of FIG. 2. FIG. 5 (a) is a section of the pixel portion taken along line 8a—8a of FIG. 1 on the lefthand side; and FIG. 5(c) is a section in the vicinity of an external connection terminal DTM to be connected with the video signal driver, on the righthand side.

In the manufacture of this panel, if the size of this panel is small, a plurality of devices are simultaneously fabricated on a single glass substrate and then divided, so as to improve the throughput. If the size is large, a glass substrate having a size standardized for any kinds is processed, and the size is reduced in conformity with the individual kind so that the same manufacturing facility may be used. In either case, the glass is cut after it is passed through the fabrication steps. Of FIGS. 1 and 2 showing the latter fabrication, FIG. 2 shows the upper and lower substrates SUB1 and SUB2 after the cut, and FIG. 1 shows the same before the cut. Symbol LN designates the edges of the two substrates before the cut, and CT1 and CT2 designate the positions of the substrates SUB1 and SUB2 to be cut, respectively. In the completed state in either case, at the portions in which external connection terminal groups Tg and Td (the adscripts bracket are omitted) are present (located at the upper and lower sides and the lefthand side), the size of the upper substrate SUB2 is so restricted that the upper substrate SUB2 is inside the lower substrate SUB1 and those portions may be exposed outside. The terminal groups Tg and Td are termed by grouping a plurality of scanning circuit connecting terminals GTM, video signal circuit connecting terminals DTM and their lead wiring lines, as will be later described, in units of a tape carrier package TCP on which is mounted an integrated circuit chip CHI. The lead-out lines from the matrix portion of each group to the external connection terminal portion are inclined more toward the two ends. This is because the terminals DTM and GTM of the display panel PNL are adjusted to the array pitch of the package TCP and the connection terminal pitch in each package TCP.

As shown in FIG. 1, before the glass is cut to separate the substrate SUB1, the terminals in the groups Tg and Td are shorted by shorting wires SHg and SHd, which are electrically coupled to each other at a connection portion PRT, so as to prevent electrostatic breakdown of the thin film transistors.

Between and along the edges of the transparent glass substrates SUB1 and SUB2, the seal pattern SL is formed, except for a liquid crystal sealing port INJ, so as to seal the liquid crystal LC. The sealing material is exemplified by an epoxy resin. The common transparent pixel electrode ITO2 on the upper transparent glass substrate SUB2 side is connected at least at one portion, i.e., at the four corners of the panel in the present embodiment through a silver paste material AGP with a lead-out wiring INT which is formed on the lower transparent glass substrate SUB1 side. This lead-out wiring INT is formed at the same manufacturing step as that of the gate terminal GTM and the drain terminal DTM, as will be described hereinafter.

The individual layers of the orientation films ORI1 and ORI2, the transparent pixel electrode ITO1 and the common transparent pixel electrode ITO2 are formed inside the seal pattern SL. Polarizing sheets POL1 and POL2 are formed on the outer surfaces of the lower transparent glass substrate SUB1 and the upper transparent glass substrate SUB2. The liquid crystal LC is sealed in the region partitioned by the seal pattern SL between the lower orientation film ORI1 and the upper orientation film ORI2 for setting the orientation of the liquid crystal molecules. The lower orientation film ORI1 is formed over a passivation film PSV1 on the lower transparent glass substrate SUB1 side.

This liquid crystal display device is assembled by stacking the various layers individually on the lower transparent glass substrate SUB1 and on the upper transparent glass substrate SUB2 side, by forming the seal pattern SL on the substrate SUB2 side, by overlapping the lower transparent glass substrate SUB1 and the upper transparent glass substrate SUB2, by injecting the liquid crystal LC through the sealing port INJ of the seal member SL, by sealing the sealing port INJ with an epoxy resin, and by cutting the upper and lower substrates.

<<Thin Film Transistor TFT>>

Referring to FIG. 5(a) the construction of the TFT substrate SUB1 will be described in more detail.

The thin film transistor TFT operates to reduce its channel resistance between its source and drain, when a positive bias is applied to its gate electrode GT, and to raise the channel resistance when the bias is reduced to zero.

Each pixel is redundantly equipped with a plurality of (two) thin film transistors TFT1 and TFT2. These thin film transistors TFT1 and TFT2 have substantially the same sizes (the channel length and the channel width are the same), and each has the gate electrode GT, a gate insulating film GI, an i-type (intrinsic not doped with a conductivity type determining impurity) semiconductor layer AS made of i-type amorphous silicon (Si), and a pair of a source electrode SD1 and a drain electrode SD2. Incidentally, it should be understood that the source and drain are intrinsically determined depending upon their bias polarities and are interchanged during the operation because their polarities are inverted in the circuit of this liquid crystal display device. For the convenience of description, however, fixedly one is the source whereas the other is the source in the following description.

<<Gate Electrode GT>>

The gate electrode GT is formed to protrude vertically from the scanning signal line GL (branched into the shape of a letter "T"). The gate electrode GT protrudes over the individual active regions of the thin film transistors TFT1 and TFT2. The individual gate electrodes GT of the thin film transistors TFT1 and TFT2 are made integrally (as the common gate electrode) and connected to the scanning signal lines GL. In the present embodiment, the gate electrodes GT are formed of a single-layer second conductive film g2. This second conductive film g2 is composed of an aluminum (Ar) film and an anodized film AOF is formed thereon.

This gate electrode GT is made larger than the i-type semiconductor layer AS to cover it completely (when viewed from below) thereby to shield the i-type semiconductor layer AS from external light or the back light.

<<Scanning Signal Line GL>>

The scanning signal line GL is formed of the second conductive film g2. This second conductive film g2 for the scanning signal line GL is formed at the same manufacturing step as that of the second conductive film g2 for the gate electrode GT, integrally with the same. The anodized film AOF is also formed over the scanning signal line GL.

<<Insulating Film GI>>

The insulating film GI is used in the thin film transistors TFT1 and TFT2 as a gate insulating film for applying an electric field to not only the gate electrode GT, but also to the semiconductor layer AS. The insulating film GI is formed over the gate electrode GT and the scanning signal line GL. As the insulating film GI, there is selected a silicon nitride film which is formed by plasma CVD, for example, to have a thickness of 1,200 to 2,700 angstroms (about 2,000 angstroms in the present embodiment). The gate insulating film GI is formed, as shown in FIG. 1, to encompass the entirety of the matrix portion AR and is removed at its peripheral portion to expose the external connection terminals DTM and GTM to the outside. The insulating film GI also contributes to the electric insulation between the scanning signal line GL and the video signal line DL.

<<i-type Semiconductor Layer AS>>

The i-type semiconductor layer AS is formed, in the present embodiment, as an independent island in each of the thin film transistors TFT1 and TF2 and is made of amorphous silicon to have a thickness of 200 to 2,200 angstroms (about 2,000 angstroms in the present embodiment). A layer d0 is an N+-type amorphous silicon semiconductor layer doped with phosphor (P) for the ohmic contact, and only the portion where the i-type semiconductor layer As exists therebelow and where the conductive layer d2 (d3) exists thereover remains.

The i-type semiconductor layer AS is also formed at the intersecting portion (crossover portion) between the scanning signal line GL and the video signal line DL. The i-type semiconductor layer As at this intersecting portion reduces the possible of a short-circuit between the scanning signal line GL and the video signal line DL.

<<Transparent Pixel Electrode ITO1>>

The transparent pixel electrode ITO1 forms one of the pixel electrodes of the liquid crystal display portion.

This transparent pixel electrode ITO1 is connected with both the source electrode SD1 of the thin film transistor TFT1 and the source electrode SD2 of the thin film transistor TFT2. As a result, even if one of the thin film transistors TFT1 and TFT2 becomes defective, a suitable portion may be cut off with a laser beam or the like, if the defect exerts a side effect. Otherwise, no measure is required because the other thin film transistor normally operates. The transparent pixel electrode ITO1 is composed of a first conductive film d1, which is composed of a transparent conductive film (Indium-Tin-Oxide ITO: nesa film) formed by sputtering, and formed to have a thickness of 1,000 to 2,000 angstroms (about 1,400 angstroms in the present embodiment).

<<Source Electrode SD1, Drain Electrode SD2>>

The source electrode SD1 and the drain electrode SD2 are formed of a second conductive film d2 in contact with an N+-type semiconductor layer d0 and a third conductive film d2 formed over the former, respectively.

The second conductive film d2 is formed of a chromium (Cr) film by sputtering to have a thickness of 500 to 1,000 angstroms (about 600 angstroms in the present embodiment). The thickness of the Cr film is less than about 2,000 angstroms because its excessive thickness increases stress. The Cr film is used to improve the adhesion to the N+-type semiconductor layer d0 and to prevent (so-called "barrier layer") the Ar of the third conductive film d3 from diffusing into the N⁺-type semiconductor layer d0. The second conductive film d2 may be formed of not only the Cr film, but also a film of a refractory metal (Mo, Ti, Ta or W) or a silicide film ($MoSi_2$, $TiSi_2$, $TaSi_2$ or $WSi_2$).

The third conductive film d3 is formed by sputtering Ar to have a thickness of 3,000 to 5,000 angstroms (about 4,000 angstroms in the present embodiment). The Ar film has less stress than the Cr film so that it can be given a larger thickness to reduce the resistances of the source electrode SD1, the drain electrode SD2 and the video signal line DL and to ensure step climb-over due to the gate electrode GT or the i-type semiconductor layer AS (to improve the step coverage).

After the second conductive film d2 and the third conductive film d3 have been patterned with the same mask pattern, the N⁺-type semiconductor layer d0 is removed by using the same mask or by using the second conductive film d2 and the third conductive film d3 as a mask. In other words, the portions of the N⁺-type semiconductor layer d0, which remains over the i-type semiconductor layer AS, are removed in a self-alignment manner, except for the second conductive film d2 and the third conductive film d3. Since the whole thickness of the N⁺-type semiconductor layer d0 is then etched, the surface of the i-type semiconductor layer As is also etched slightly, but this etching may be controlled by changing the etching period.

<<Video Signal Line DL>>

The video signal line DL is formed of the second conductive film d2 and the third conductive film d3, which are in the same layer of the source electrode SD1 and the drain electrode SD2.

<<Passivation Film PSV1>>

Over the thin film transistor TFT and the transparent pixel electrode ITO1, there is formed the passivation film PSV1. This passivation film PSV1 is formed mainly to protect the thin film transistor TFT from moisture or the like and is made highly transparent and resistant to moisture. The passivation film PSV1 is formed of a silicon oxide film or silicon nitride film by a plasma CVD apparatus, for example, to have a thickness of about 1 micron.

The passivation film PSV1 is formed, as shown in FIG. 1, to encompass the matrix portion AR as a whole and is removed at its peripheral portion to expose the external connection terminals DTM and GTM to the outside and at its portion where the common electrode COM on the upper substrate SUB2 side is connected with the leading line INT for the external connection terminal of the lower substrate SUB1 through the silver paste AGP. The passivation film PSV1 and the gate insulating film GI are made such that the former is thick for a protective effect, whereas the latter is thin for the mutual conductance gm of the transistors. As a result, as shown in FIG. 1, the passivation film PSV1 having a great protective effect is made larger than the gate insulating film GI so as to protect the peripheral portion over as wide an area as possible.

<<Black Matrix BM>>

On the upper transparent glass substrate SUB2 side, there is provided as a shielding film the black matrix BM for shielding the i-type semiconductor layer As from external light or the back light. The closed polygonal contour of the black matrix BM provides an aperture having no black matrix BM therein. This black matrix BM is made of an organic resin, such as an acrylic, epoxy or polyimide resin containing carbon black or black organic pigment, and has a thickness of 0.5 to 2.5 microns (about 1.6 microns in the present embodiment).

As a result, the i-type semiconductor layer AS of the thin film transistors TFT1 and TFT2 is sandwiched between the black matrix BM and the large gate electrode GT arranged above and below the layer AS, so that it is shielded from external natural light or the back light. The black matrix BM is formed into a lattice shape around the individual pixels to define the effective display region of each pixel. As a result, the contour of each pixel is clearly defined by the black matrix BM to improve the contrast. In short, the black matrix BM has two functions to shield the i-type semiconductor layer AS from light and to provide a black matrix.

The edge portion at the root of the transparent pixel electrode ITO1 in the rubbing direction is also shielded by the black matrix BM, so that, if any domain is produced in that portion, it is invisible, not deteriorating the display characteristics.

The black matrix BM is also formed in a picture-frame shape in the peripheral portion, as shown in FIG. 2, such that its pattern is formed continuously with the pattern of the matrix portion having a plurality of dot-shaped apertures. The seal portion in the periphery has a light-shielding property and so light, such as the reflected light, coming from the apparatus mounted with this liquid crystal display element, such as a personal computer, from entering the matrix portion, because the seal member SL is opaque.

<<Color Filter FIL>>

The color filter FIL is formed into a stripe shape having repetitions of red, green and blue colors at positions confronting the pixels. The color filter FIL is made so large as to cover the transparent pixel electrode ITO1 as a whole, and the black matrix BM is formed inside the peripheral edge of the transparent pixel electrode ITO1 so that it may overlap the edge portions of the color filter FIL and the transparent pixel electrode ITO1.

The color filter FIL can be formed in the following manner. First of all, a dye base, such as of an acrylic resin, is formed over the surface of the upper transparent glass substrate SUB2 and is removed other than the part at its red filter forming region by photolithography. After this, the dye base is dyed with a red pigment and fixed to form a red filter R. Then, a green filter G and a blue filter B are sequentially formed using similar steps.

<<Passivation Film PSV2>>

The passivation film PSV2 is provided for preventing the coloring material of the color filter FIL from leaking into the liquid crystal LC. The passivation film PSV2 is made of a transparent resin material, such as an acrylic resin or an epoxy resin.

<<Common Transparent Pixel Electrode ITO2>>

The common transparent pixel electrode ITO2 confronts the transparent pixel electrode ITO1 which is provided for each pixel on the lower transparent glass substrate SUB1 side, and the optical state of the liquid crystal LC changes in response to the potential difference (electric field) between each pixel electrode ITO1 and the common transparent pixel electrode ITO2. A common voltage Vcom is applied to the common transparent pixel electrode ITO2. In the present embodiment, this common voltage Vcom is set to an intermediate DC potential between the lowest level drive voltage Vdmin and the highest level drive voltage Vdmax to be applied to the video signal line DL. However, an AC voltage may be applied if the supply voltage of the integrated circuit used in the video signal driver is required to be lowered to about a half. Incidentally, the top plan shape of the common transparent pixel electrode ITO2 is shown in FIGS. 1 and 2.

<<Drain Side Output Wiring on Drain Side>>

Figure 6A:
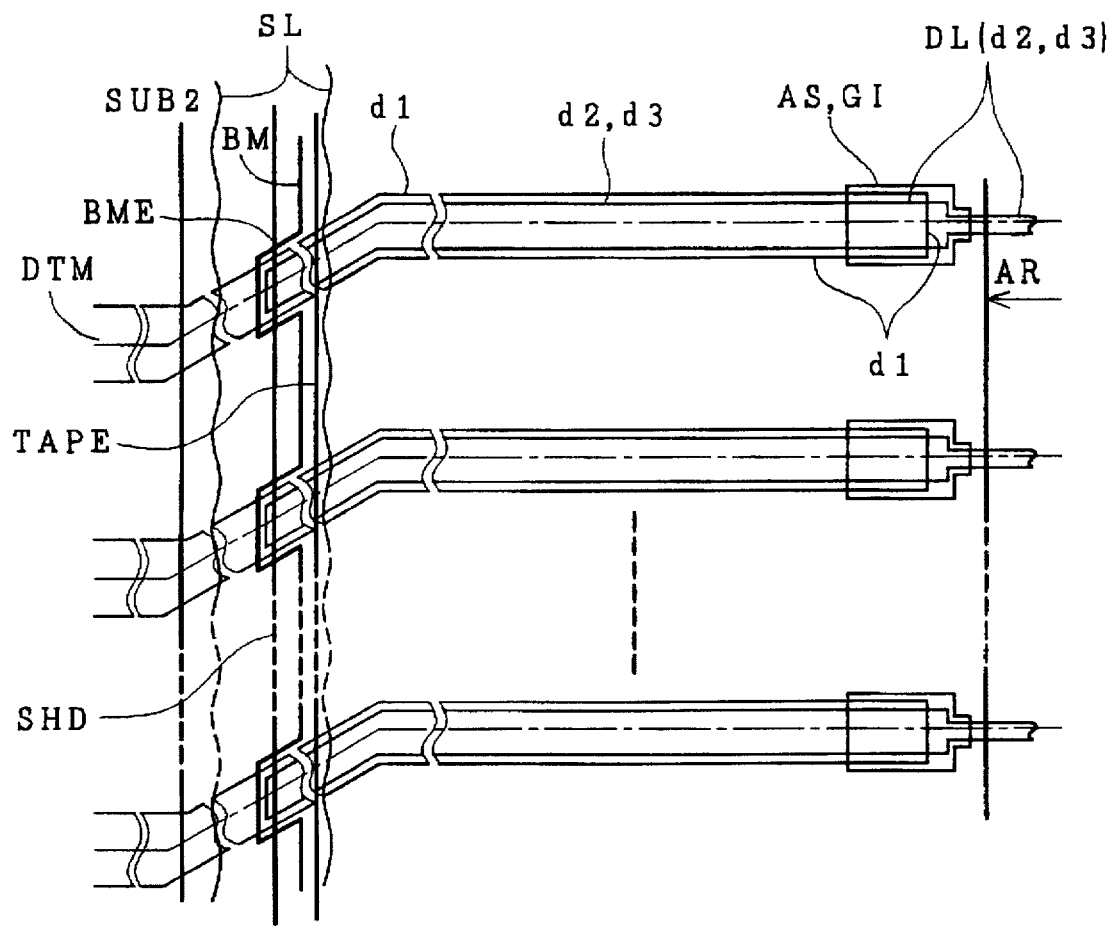
FIG. 6(A) is a top plan view showing one example of the output wiring on the drain side.

FIG. 6(A) is a top plan view showing one example of the output wiring on the drain side.

To the output wiring on the drain side, there is applied, as the drain voltage fed to the drain line (the video signal line) DL, a voltage which varies in its level between about 0 to 3 V for every about 26 microseconds of one horizontal period. For example, the resistance R of the drain line DL in the effective display portion AR is about 8.8 kilohms, and the total value C of the capacitance loaded as the liquid crystal display panel upon the drain line DL is about 55 picofarads. This causes waveform distortion of about 0.4 microseconds due to the RC constant. Even if the width is assumed to be 30 microns, as described above, the increase in the waveform distortion from the resistance difference of 1 kilohm is about 0.1 microseconds, so that this delay in the rise of the drain waveform can be substantially prevented from exerting adverse affect upon the display by the means for shifting and delaying the rise of the gate waveform in a suitable relation. On the other hand, the distortion of the rise of the gate waveform leads unchangedly to the reduction in the writing time period. As a result, a larger allowance of the variation of the wiring resistance of the output wiring on the drain side than on the gate side can be taken, and a wiring method where the reliability is thought important can be adopted.

First of all, in the present embodiment, the distance from the seal portion SL to the effective display portion (the effective pixel area) AR is about 2.2 nun, and for the wiring resistance therebetween the wiring layers d2 and d3 made of a low resistance material is used, so that it can be characteristically neglected. When the wiring layer d3 has a film thickness of 4,000 angstroms, Ar—Pd has a resistivity of about 0.1 ohms/□, Ar—Ta—Ti has a resistivity of about 0.2 ohms/□, and Ar—Ta has a resistivity of about 0.5 ohms/□, so that the wiring resistance is no more than 50 ohms even if the wiring width is assumed to be 30 microns.

Figure 6B:
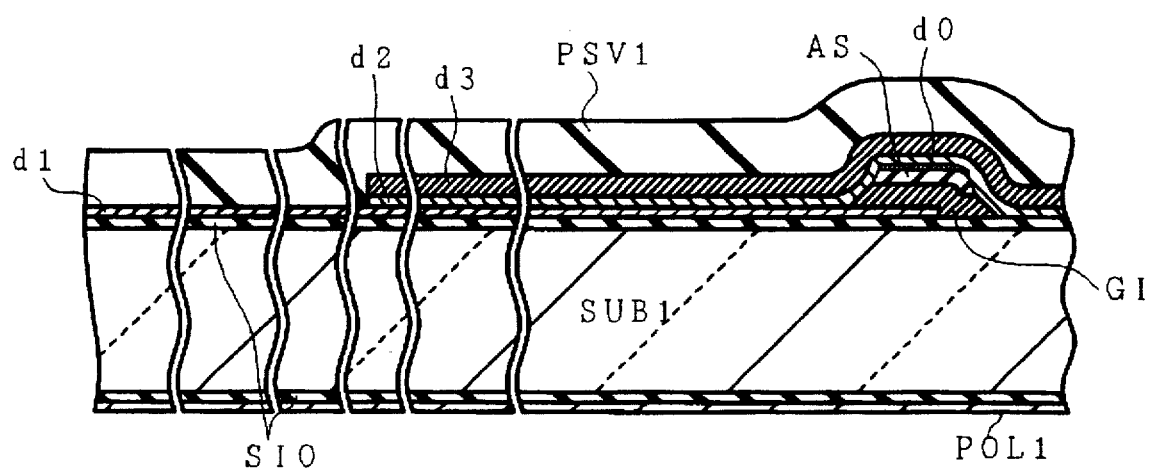
FIG. 6(B) is a section taken along dash-and-dot line of FIG. 6(A)

Incidentally, FIG. 6(B) is a section taken along the dash-and-dot line of FIG. 6(A). In the connection portion between the drain line DL and the output wiring line of the effective display area AR, however, the output wirings d2 and d3 are prevented from being broken due to the step of the transparent conductive film d1 in the case of the direct connection by interposing the N⁺-type amorphous Si film d0, the i-type amorphous film As and the Si nitride film GI between the connection portion and the transparent conductive film d1 and by tapering them in section. Next, outside the seal portion, the wiring is formed using only the transparent conductive film d1 of relatively stable reliability.

It has been experimentally found that the wiring using the transparent conductive film ITO is less likely to electrically decompose than the low resistance wiring including a layer of aluminum Ar. An accelerated experiment was conducted in which the two electrode terminals were spaced at a predetermined distance without the passivation film PSV1, pure water was dripped and an AC current having a frequency of 15.6 KHz and a peak voltage of 4 V was applied, and the results showed that no electrolytic corrosion of the wiring using the transparent conductive film ITO occurred for more than 90 minutes, not raising any problem. On the other hand, the same experiment showed that the two-layered wiring including an aluminum Ar layer and formed over the wiring of the transparent conductive film ITO was electrolytically corroded after a lapse of only 50 minutes.

Moreover, the wiring using the transparent conductive film ITO is improved in its corrosion resistance by covering it with the passivation film PSV1.

<<Gate Side Output Wiring on Gate Side>>

Figure 7:
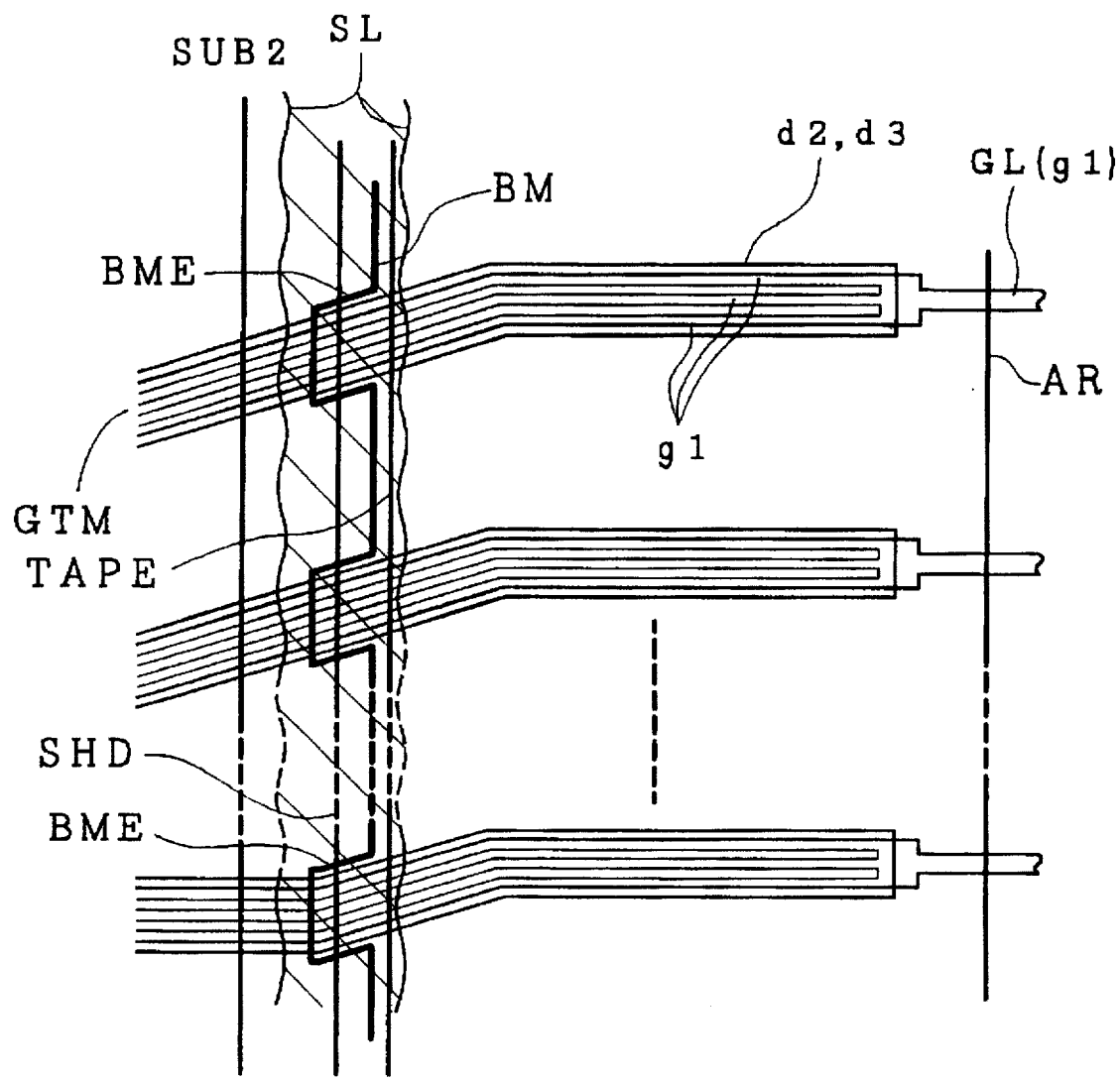
FIG. 7 is a top plan view showing one example of the output wiring on the gate side.

FIG. 7 is a top plan view showing one example of the output wiring on the gate side.

To the output wiring on the gate side, there are applied, as the gate voltage for the gate line GL, for example, a voltage of about 10 V in the form of pulses during the gate-on period for one horizontal period of about 26 microseconds and a gate OFF voltage (of about −14 to −9 V) during the remaining gate off period (of about 16 milliseconds).

However, the resistance R of the gate line GL in the effective display portion AR is about 12 kilohms, for example, and tho total value C of the capacitance loaded upon the gate line GL as the liquid crystal display panel is about 270 picofarads. This causes waveform distortion of about 3.2 microseconds due to the RC constant. The rise distortion in the gate waveform leads, as it is, to the reduction of the writing time period. On the gate side, therefore, it is necessary to reduce not only the variation of the wiring resistance, but also the resistance itself of the output wiring.

In the present embodiment, the gate wiring layer g1 containing aluminum is extended as far as possible to the outside of the seal member SL, thereby to lower the resistance.

<<Black Matrix BM, Seal Member SL & Shield Tape TAPE>>

Figure 8:
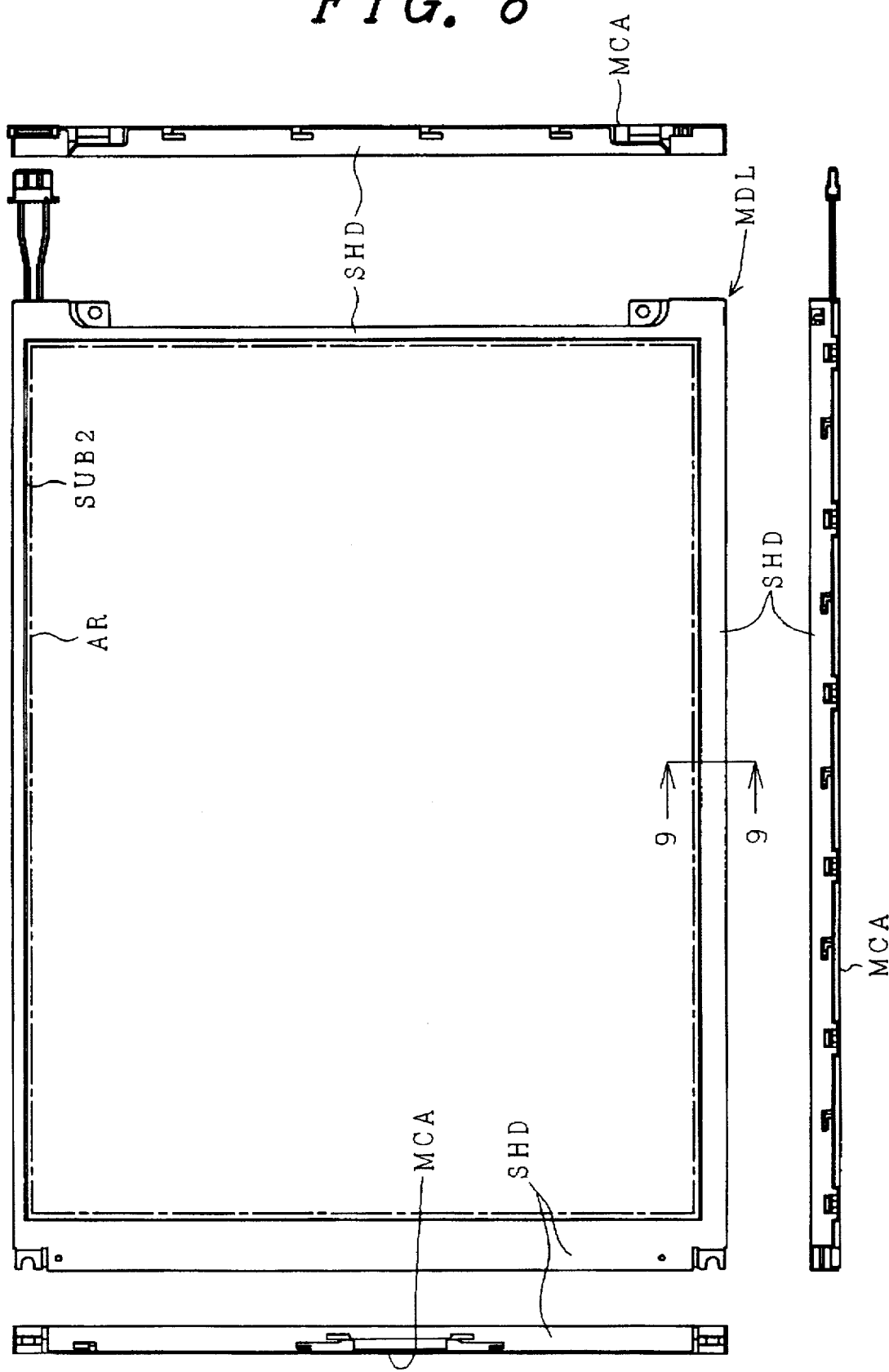
FIG. 8 presents a top plan view and a side elevation, viewed from the shield case of the active matrix type color liquid crystal display device according to the present invention.

FIG. 8 is a top plan view and a side elevation, when viewed from the shield case SHD of the active matrix type color liquid crystal display device according to the present invention.

Figure 9:
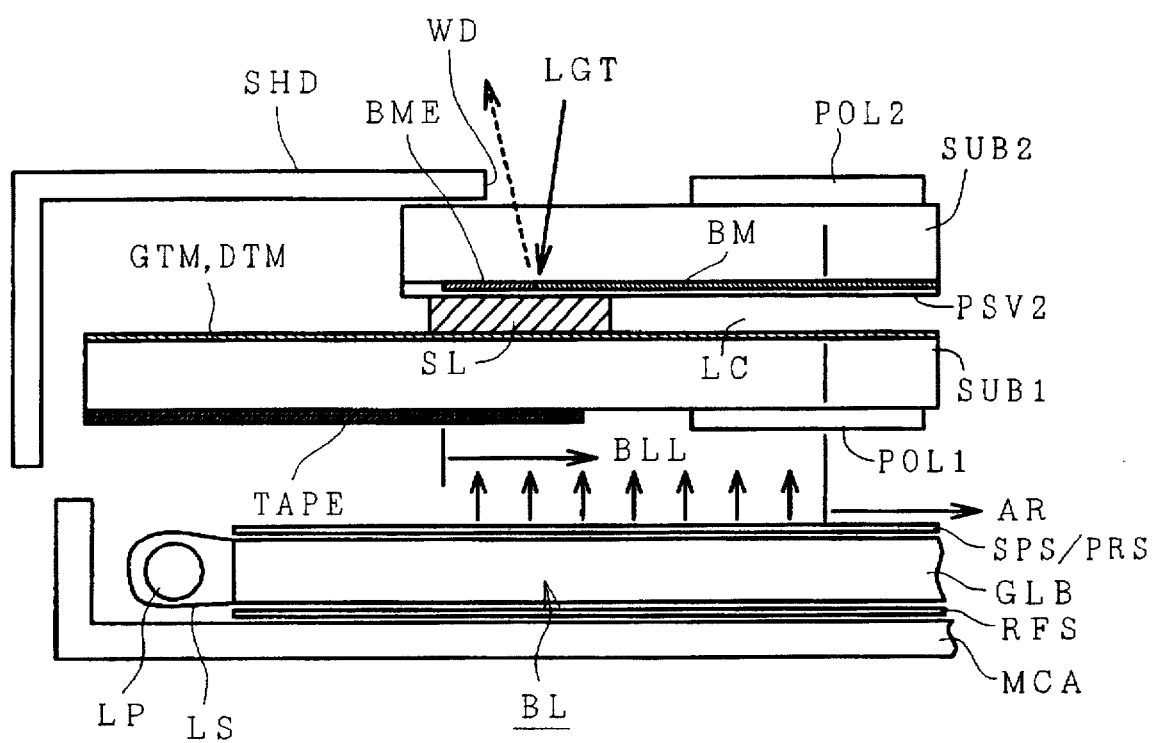
FIG. 9 is a schematic section showing the end portion in the vicinity of the seal portion of the liquid crystal display element according to the present invention.

FIG. 9 is a schematic section showing the end portion of the active matrix type color liquid crystal display device according to the present invention, that is, the end portion in the vicinity of the seal portion, in which a pair of upper and lower transparent glass substrates constituting the liquid crystal display element are joined to seal the liquid crystal inbetween.

FIG. 9 is a section taken along line 9—9 of the top plan view of FIG. 8.

Reference symbol SUB1 designates the lower transparent glass substrate; SUB2 the upper transparent class substrate; BM the black matrix; BME an end portion of the black matrix BM; PSV2 the passivation film; SL the seal member; LC the liquid crystal layer; TAPE a shield tape; GTM and DTM the wiring (external connection terminals); POL1 and POL2 the polarizing sheets; AR the matrix portion (the display region); SHD the metallic shield case; WD the display window composed of the opening of the shield case SHD; LGT external light on the display screen side; and BLL back light. Incidentally, the details of the sectional structure are shown in FIGS. 5(a) to 5(c).

In the present embodiment, the black matrix BM is made of a colored organic resin, such as an acrylic, epoxy or polyimide resin, to which is added carbon black or black organic pigment. When viewed in the direction normal to the faces of the substrates SUB1 and SUB2, as shown in FIGS. 9, 2 and 1, the portion., in which the seal member SL and the black matrix BM are overlapped over substantially the whole periphery of the seal member SL, excepting the liquid crystal sealing port (designated by INJ of FIG. 2), is provided on the display region AR side, and the remaining portion is provided on the opposite side to the display region AR. Incidentally, the black matrix BM is provided at least at the portion in the region of the display window WD of the shield case SHD, which has the seal member SL. On the other hand, the black matrix BM is formed, when viewed in the direction normal to the faces of the substrates SUB1 and SUB2, at least at the portion in which the reflective metal portions (excepting the transparent conductive film) of the wiring GTM and DTM over the shield case SHD and the lower transparent glass substrate SUB1 are not overlapped. Moreover, the shield tape TAPE is stuck through an adhesive layer to the lower face of the lower transparent glass substrate SUB1 from the seal member SL to the end portion of the substrate SUB1, including at least the portion where the seal member SL and the black matrix BM are not overlapped. Still moreover, the end portion BME of the black matrix BM on the opposite side to the display region AR is provided along the patterns of the wiring GTM and DTM, as shown in FIGS. 6(A) and 7.

In the present embodiment, the black matrix BM is made of the colored organic resin of low reflectivity. Consequently, when the substrate SUB2 side, equipped with the black matrix BM, faces the display screen (the viewed side), it is possible to solve the problem that external light on the display screen side reflects from the black matrix BM toward the outside (toward the viewed side), hence the screen (like a mirror) becomes hard to view and the contrast drops, causing a lowering of the display quality.

Over substantially the whole periphery of the seal member SL, on the other hand, the black matrix BM, made of an organic resin having a poor adhesion to the glass substrate or the seal member is partially removed to form portions in which the black matrix BM and the seal member SL are and are not overlapped. In the non-overlapped portions, therefore, the combination of the glass substrate SUB2, the passivation film PSV2, and the seal member SL, for example, has a high adhesion strength, so that the adhesion strength of the seal portion can be improved.

The shield tape TAPE is stuck to the lower face of the lower transparent glass substrate SUB1 at the portion in which the seal member SL and the black matrix BM are not overlapped, so that the back light BLL at the portion in the seal portion can be prevented from leaking. In order to improve the adhesion strength, more specifically, the shield tape TAPE is used to prevent the leakage of the back Light BLL when the black matrix BM in the seal portion is partially removed to form the portion in which it is not overlapped with the seal member SL. At least the adhesive side, stuck to the substrate SUB1, of the shield tape TAPE, is black and non-reflective. The shield tape is preferably black to prevent its face stuck to the glass substrate SUB1 from being viewed from the display screen through the wiring made of the transparent conductive film. In order that light may not reflect from the interface between the shield tape and the glass substrate SUB1, moreover, the refractive index of the face, in contact with the glass substrate SUB1, of the shield tape is desirably made approximate to that of the glass substrate SUB1 to provide a non-reflective face at the interface between the shield tape and the glass substrate SUB1. If the seal member SL and the black matrix BM are locally overlapped over the whole periphery of the seal member SL, gap irregularity occurs between the two substrates SUB1 and SUB2 of the liquid crystal display element, thereby causing display irregularity. From these, therefore, the black matrix BM and the seal member SL form the overlapped portion over substantially the whole periphery other than the liquid crystal sealing port (designated by INJ in FIG. 2).

The black matrix BM is formed at least at the portion in which the shield case SHD having the display window WD and the reflective metal portion of the wiring GTM and DTM formed on the lower transparent glass substrate SUB1 are not overlapped, so that external light LGT at that portion in the seal portion can be prevented from reflecting light, as shown by the broken arrow. Specifically, if the external light LGT impinges upon the wiring GTM and DTM and reflects therefrom when the black matrix BM is partially removed at the seal portion so as to improve the adhesion strength, the display quality drops. Therefore, the black matrix BM is left in the portion which is located outside the shield case SHD, that is, at the metal portions of the wiring GTM and DTM in the region of the display window WD, thereby preventing reflection of the external light LGT.

Moreover, the masking of the seal portion with the shield case SHD covering the outer periphery of the liquid crystal display element can be dispensed with, thus providing a small-sized liquid crystal display with a large screen having a wide display area.

In the present embodiment, there is formed over the transparent glass substrate SUB2 a predetermined pattern of the black matrix BM which is made of an organic resin, such as an acrylic, epoxy or polyimide resin containing carbon black or black organic pigment added thereto, and the color filters FIL (R), (G) and (B) are formed in individual predetermined patterns over the black matrix BM. Incidentally, the black matrix BM has an absorbance (an OD value) ranging from 1.5 to 3.7 in the visible region and has chromaticities of 0.2 to 0.5 for both x and y, measured using a C-light source. As the color filters FIL photo-setting negative resists to which are added organic pigments conforming to the individual chromaticities are used, and are sequentially formed by photo-lithography. After this, in order to prevent impurities from eluting from the colored region and to retain the surface flatness, acrylic or epoxy resin is applied by spin-coating, roll coating or transfer-printing, and is thermally treated to set thereby to form the passivation film PSV2 over the black matrix BM and the color filter FIL, thus forming the passivation film PSV2 over the black matrix BM and the color filter FIL. Over the passivation film PSV2, a transparent conductive film made mainly of indium oxide is formed by sputtering to form the transparent pixel electrode ITO2, thus forming the substrate on the color filter side. Next, the orientation film ORI2 is transferred to the transparent pixel electrode ITO2 of the substrate by transfer-printing and is then thermally treated at 180° to 220° C. The orientation film ORIL is also formed over the substrate or the opposite substrate having the thin film transistor TFT, followed by a similar heat treatment. Next, the two substrates are subjected to orientation treatment, and the seal member SL is formed over either of the substrates by screen printing or dispenser-coating. Incidentally, the seal member SL comes into contact with the terminal portion of the transparent pixel electrode (see in FIG. 5) so that it is required to have insulation properties, that is, to have an electric resistance of $10^8$ ohms.cm or more. In addition, the seal member SL is adjusted to have predetermined optical characteristics. After this, the solvent is dried, and numerous spacers (although not shown) for controlling the gap are dispersedly secured between the upper and lower substrates all over the surface of one substrate. After this, the substrate and the opposite substrate are assembled and thermally set at 150° to 180° C. for one to four hours while applying a load of 0.5 to 1.0 Kg/cm². Incidentally, the black matrix BM of the completely set substrate has an absorbance (OD value) of 1.5 to 3.5 in the visible range, and the chromaticities, measured using a C-light source, are within 0.2 to 0.5 for both x and y. After this, the substrates are cut to the predetermined sizes, and the liquid crystal LC is injected into the gap between the substrates. The polarizing sheets POL1 and POL2 are joined to the outer sides of the two substrates, and the shield tape TAPE is stuck to the outer side of the substrate SUB1, thus completing the liquid crystal display element. As a result, when this liquid crystal display element is operated, the light BLL emitted from the back light is interrupted at the portion other than the display region by the black matrix BM and the shield tape TAPE, so that a color liquid crystal display element having an excellent display quality can be provided.

In FIG. 9, for example, the seal member SL has a width of 1.0 mm; the black matrix BM and the seal member SL have an overlap width of 0.3 mm and an non-overlap width of 0.7 mm; the wiring lines GTM and DTM and the black matrix end portion BME have an overlap width of 5 microns or more; the end portion of the substrate SUB2 and the black matrix BM have a gap of 1.0 mm or more; the black matrix BM and the shield tape TAPE have an overlap width of 0.7 mm; the black matrix end portion BME and the shield case SHD have an overlap width of 0.3 mm or more; the shield tape TAPE and the display pixel of the display region AR have a gap of 1.0 mm or more; the end portion of the substrate SUB2 and the end portion of the seal member SL have a gap of 0.3 mm; end the end portion of the substrate SUB2 and the black matrix BM have a gap of 1.0 mm.

Although the present invention has been specifically described, with reference to an exemplary embodiment, it should not be limited thereto, but can naturally be modified in various manners within the scope not departing from the gist thereof. Although the present invention has been applied to an active matrix liquid crystal display device, for example, it can naturally be applied to a simple matrix liquid crystal display device.

Moreover, even if the present invention is applied to not only the embodiment in which the black matrix is made of a resin, but also an embodiment in which the black matrix is composed of a metal film having a poor adhesion to the substrate, it is possible to achieve an effect to prevent the seal member from separating from the interface between the black matrix and the substrate in the seal portion.

In the embodiment in which the black matrix is formed of a resin, however, there can be achieved an effect to prevent external light from being reflected by the black matrix.

In the foregoing embodiment, the shielding adhesive tape is used as the shielding means for shielding the back light in the region corresponding to the portion in which the seal member on the face not facing the seal member of the first substrate and the black matrix are not overlapped. However, the shielding means may be any of a shielding coating film, a metal film or a shielding metal oxide film.

In the embodiment using the shielding adhesive tape as the shielding means, however, the component cost of the shielding means can be lowered to reduce the cost of manufacturing the liquid crystal display device.

Effect of the Invention

As has been described hereinbefore, according to the present invention, the black matrix is made of a colored organic resin having a low reflectivity, so that the problem of the reflection of external light can be solved. Since the seal portion is equipped with the black matrix and the shield tape, moreover, the leakage of light at the seal portion can be prevented, thereby to improve the display quality. Since the black matrix is so arranged in the seal portion that it is not partially overlapped, even still, the black matrix can be prevented from being separated due to poor adhesion, thereby improving the reliability. Furthermore, the masking of the seal portion by the shield case for covering the outer periphery of the liquid crystal display element can be eliminated to enlarge the display area. Thus, according to the present invention, it is possible to provide a liquid crystal display device having an excellent display quality, an excellent reliability and a large display screen.

What is claimed is:

1. A liquid crystal display device comprising:
   a first substrate having a display region formed by arranging a plurality of pixel electrodes and thin film transistors for selecting said pixel electrodes, in a matrix shape over a transparent insulating substrate;
   a second substrate composed of a transparent insulating substrate and overlapping with said first substrate with a liquid crystal layer being disposed therebetween;
   a seal member formed in peripheral edge portions of said first and second substrates, around a region in which said liquid crystal layer exists outside said display region, and interposed between said first and second substrates to fix the substrates;
   an upper case covering peripheries of said first and second substrates, having an opening for exposing said display region to an outside, and composed of a shielding frame;
   illuminating means for illuminating a face of said first substrate opposed to said second substrate with a light; and
   a black matrix composed of a light shielding film, covering said thin film transistors, and provided on said second substrate;
   wherein said black matrix overlaps said seal member partially and covers a region between said display region and said seal member,
   wherein said black matrix in said seal member has a portion not overlapping said upper case, and
   wherein shielding means is mounted in a region not covered with said upper case and said black matrix, at a face of said first substrate opposed to a face confronting said seal member.

2. A liquid crystal display device according to claim 1, wherein said shielding means is composed of a black member.

3. A liquid crystal display device according to claim 2, wherein said shielding means has a non-reflective face in contact with said first substrate.

4. A liquid crystal display device according to claim 3, wherein said black matrix is made of a resin containing a black pigment added thereto.

5. A liquid crystal display device according to claim 1, wherein said shielding means is composed of a shielding tape stuck to the face of said first substrate opposed to the face confronting said seal member.

6. A liquid crystal display device according to claim 5, wherein said shielding tape is a black tape.

7. A liquid crystal display device according to claim 6, wherein a face of said shielding tape in contact with said first substrate is non-reflective.

8. A liquid crystal display device according to claim 7, wherein said black matrix is made of a resin containing a black pigment added thereto.

9. A liquid crystal display device comprising:
   a first substrate having a display region formed by arranging a plurality of pixel electrodes in a matrix shape over a transparent insulating substrate;

a second substrate composed of a transparent insulating substrate and overlapping with said first substrate through with a liquid crystal layer being disposed therebetween;

a seal member formed in peripheral edge portions of said first and second substrates, around a region in which said liquid crystal layer exists outside said display region, and interposed between said first and second substrates to fix the substrates;

an upper case covering peripheries of said first and second substrates, having an opening for exposing said display region to an outside, and composed of a shielding frame;

illuminating means for illuminating a face of said first substrate opposed to said second substrate with a light; and a black matrix composed of a light shielding film, covering a peripheral portion of said pixel electrodes, and provided on said second substrate;

wherein said black matrix overlaps said seal member partially and covers, a region between said display region and said seal member, wherein said black matrix in a region, in which said seal member exists has a portion not overlapping said upper case, and wherein shielding means is mounted in a region not covered with said upper case and said black matrix at a face of said first substrate opposed to a face confronting said seal member.

10. A liquid crystal display device according to claim 9, wherein said shielding means is composed of a black member.

11. A liquid crystal display device according to claim 10, wherein said shielding means has a non-reflective face in contact with said first substrate.

12. A liquid crystal display device according to claim 11, wherein said black matrix is made of a resin containing a black pigment added thereto.

13. A liquid crystal display device according to claim 12, wherein said shielding means is composed of a shielding tape stuck to the face of said first substrate opposed to the face confronting said seal member.

14. A liquid crystal display device according to claim 13, wherein said shielding tape is a black tape.

15. A liquid crystal display device according to claim 14, wherein a face of said shielding tape in contact with said first substrate is non-reflective.

16. A liquid crystal display device according to claim 15, wherein said black matrix is made of a resin containing a black pigment added thereto.

17. A liquid crystal display device comprising:

a first substrate having a display region formed by arranging a plurality of scanning signal lines and a plurality of video signal lines composed of a metal layer over an insulating substrate and by forming pixels composed of pixel electrodes and thin film transistors corresponding to the individual intersections between said plurality of scanning signal lines and said plurality of video signal lines;

a second substrate composed of a transparent insulating substrate and overlapping with said first substrate with a liquid crystal layer being disposed therebetween;

a seal member formed in peripheral edge portions of said first and second substrates, around a region in which said liquid crystal layer exists outside said display region, and interposed between said first and second substrates to fix the substrates; and an upper case covering the peripheries of said first and second substrates, having an opening for exposing said display region to an outside, and composed of a shielding frame;

wherein said plurality of scanning signal lines and said plurality of video signal lines are extended to an outside of a region which is surrounded by said seal member, and connected to an external circuit, wherein said second substrate includes thereon a black matrix composed of a shielding film covering said thin film transistors, wherein said black matrix overlaps with said seal member partially and covers a region between said display region and said seal member, wherein said black matrix in said seal member has a portion not overlapping with said upper case, and wherein in a region in which said seal member is not covered with said upper case, a portion in which said scanning signal lines and said video signal lines exist is covered with said black matrix.

18. A liquid crystal display device according to claim 17, wherein said seal member which exists between said plurality of scanning signal lines or between said plurality of video signal lines has a portion in which it does not overlap with said black matrix.

19. A liquid crystal display device according to claim 18, wherein said black matrix is made of a resin containing a black pigment added thereto.

* * * * *